Aug. 9, 1966  T. PRICKETT, JR., ET AL  3,266,012
CONTINUOUS WAVE APPARATUS WITH DELAY GATED FILTER
Filed Nov. 1, 1960  3 Sheets-Sheet 1

Fig. 1.

INVENTOR.
Tom Prickett Jr.
John P. Woods.
BY
ATTORNEY.

ATTEST.

Aug. 9, 1966 T. PRICKETT, JR., ETAL 3,266,012
CONTINUOUS WAVE APPARATUS WITH DELAY GATED FILTER
Filed Nov. 1, 1960 3 Sheets-Sheet 3

ATTEST.
Charles F. Steininger

INVENTOR.
Tom Prickett Jr.
John P. Woods.
BY
ATTORNEY.

United States Patent Office 3,266,012
Patented August 9, 1966

---

3,266,012
CONTINUOUS WAVE APPARATUS WITH DELAY GATED FILTER
Tom Prickett, Jr., Richardson, and John P. Woods, Dallas, Tex., assignors to The Atlantic Refining Company, Philadelphia, Pa., a corporation of Pennsylvania
Filed Nov. 1, 1960, Ser. No. 66,550
3 Claims. (Cl. 340—15.5)

This application is a continuation-in-part of copending application, Serial No. 453,853, now United States Patent No. 2,982,371, entitled, "Seismic Exploration Method and Apparatus," hereinafter to be referred to as the basic method.

This invention relates to an improved method and apparatus for continuous wave seismic operation. More particularly, the present invention relates to an improved method of operation for materially reducing the time required to conduct a continuous wave seismic operation. Most specifically, the invention relates to an improved method of operation wherein field recording time is reduced to a minimum and the over-all accuracy of the continuous wave seismic system greatly improved.

Generally, this basic method includes generating a frequency-modulated, cyclically-varying continuous wave signal at one point on the surface of the earth, picking up the generated signal at a remote point either at the surface of the earth or down a well bore, picking up the generated signal at a point adjacent the generator and time-delaying this signal in varying amounts, and combining the variably time-delayed signal and the remotely received signal in such a manner that only the remotely detected signals having the same frequency variation as the time-delayed signal and in time phase therewith, are recorded.

To better understand the present invention, which is an improvement upon the basic method disclosed in copending application, 453,853, it is necessary to consider the operation of a device capable of practicing the basic method.

The drawings utilized to illustrate the basic subject method and the improvements thereto are as follows:

FIGURE 1 is a plot of frequency versus time of a cyclically-varying continuous wave and its delayed counterparts for use in practicing the subject method.

Figure 2:
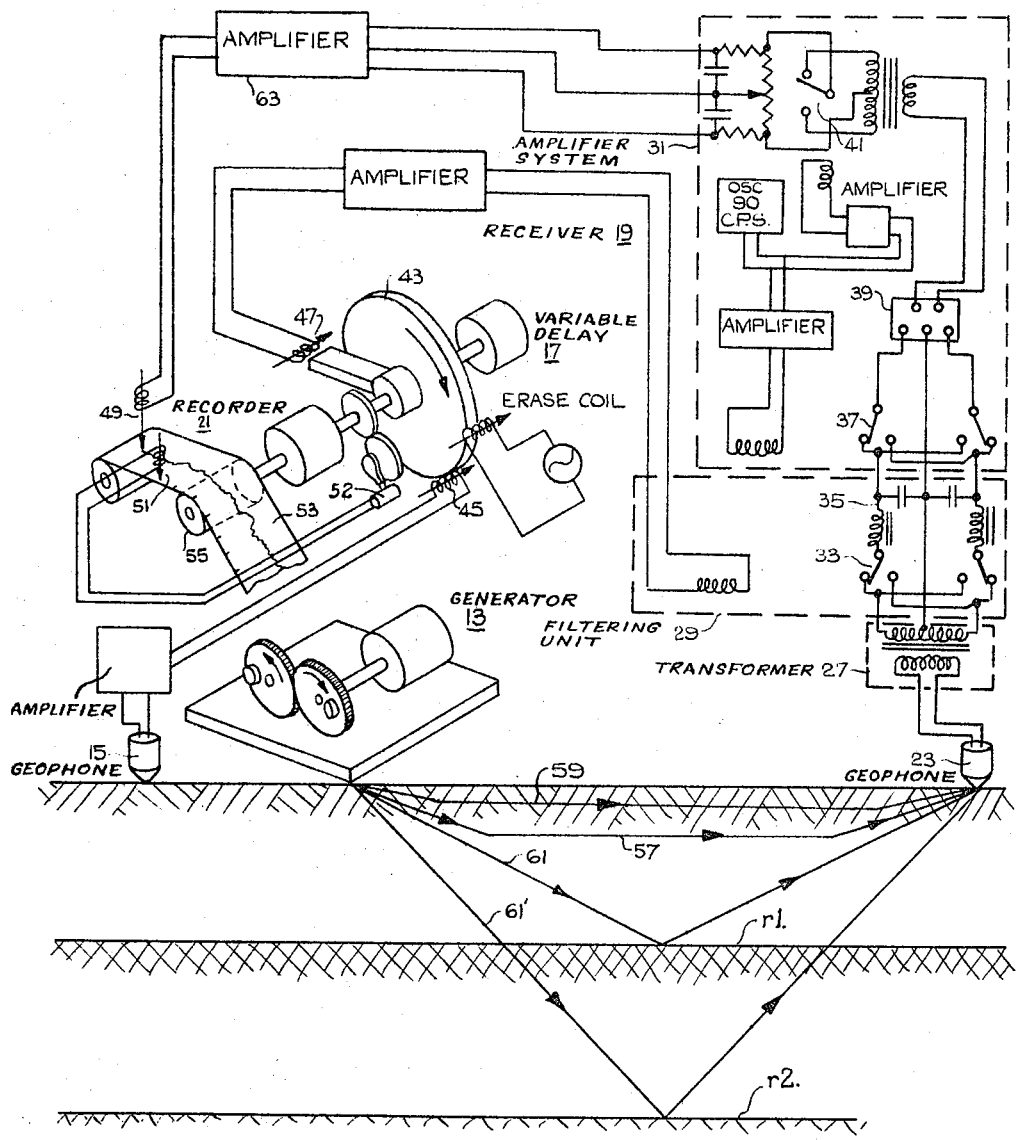
FIGURE 2 is a schematic of a device capable of practicing the basic method of operation herein.

Refer now to FIGURE 1. For purposes of illustration, FIGURE 1 discloses a plot of frequency versus time of a typical generated cyclically-varying signal 1 and its delayed counterpart signal 3 suitable for use in the subject basic method of operation. The delay time 5 between signal 1 and counterpart signal 3 can be varied. Crossover points 7 and 9 are the points of common frequency of signals 1 and 3 at a given delay time 5. Period 11 is the time required for signal 1 to execute a complete sweep of its frequency variation. When a signal is generated having unequal periods, 11 represents the shortest period with respect to time. FIGURE 1 discloses a signal in which all periods 11 are equal in time.

FIGURE 2 shows a schematic form of a device capable of practicing the basic method of operation. This device includes basic components continuous wave generator 13, geophone 15, variable delay 17, receiver 19, recorder 21, and second geophone 23.

Referring in more detail to FIGURE 2, continuous wave generator 13 produces a cyclically-varying signal such as 1 with a selected period 11 as shown in FIGURE 1. Portions of signal 1 are reflected from the various subsurface beds such as $r1$ and $r2$ shown in FIGURE 2, as will be detailed hereinafter. Generator 13 may be of any suitable type of continuous wave generator; however, it is preferable that the device be the generator and control means disclosed in copending application No. 66,548, filed November 1, 1960, owned by a common assignee. Receiver 19 can be broken down into three basic parts; i.e., coupling transformer 27, filtering unit 29, and amplifier system 31. This particular embodiment utilizes relay 33 and narrow pass band filter 35 in filter system 29. Amplifier system 31 includes synchronous relay 37, narrow band amplifier 39 and synchronous relay 41. Variable delay 17 includes magnetic drum 43, recording head 45, and rotating pickup head 47, in which angular displacement of pickup head 47 denotes the time delay after which a signal recorded by head 45 is picked up. Recorder 21 includes pen 49, pen 51, microswitch 52, chart 53, and drive 55. If we assume that generator 13 is programmed to produce a cyclically-varying signal 1, as shown in FIGURE 1, path 57 represents refracted waves, path 59 represents horizontal waves, and paths 61 and 61' represent waves reflected from two beds of interest, $r1$ and $r2$. Geophone 23 receives reflected and refracted waves which are amplified by transformer 27 in addition to the usual noise. The combined useful signals and noise are impressed on relay 33. The frequency of relay 33 is controlled by the signal received by geophone 15 and after time-delayed delay unit 17, which is set into operation immediately after generating waves in the ground. As pickup head 47 rotates and picks up the signal from geophone 15, it eventually reaches a position where the time delay of the signal it picks up is equal to the travel time of a useful seismic wave picked up by geophone 23. At this point of coincidence, relay 33, which is continuously actuated by the time-delayed signal, converts the frequency-modulated signal representing such useful wave into a low frequency signal. This low frequency signal is passed through low pass narrow band filter 35 and then amplified by means of amplifier units 31 and 63, and thereafter measured by recording pen 49 or by an appropriate meter such as shown in United States Patent No. 2,982,371. If pen 49 is used, it marks an inflection on recording chart 53 which indicates the passing of a useful signal to filter unit 29. Meanwhile, the time delay of pickup head 47 is indicated on chart 53 by time delay marks recorded by head 51 in response to pulses from microswitch 52. Accordingly, a record is obtained by which the indication of a useful signal can be correlated in respect to the time delay of the time-delayed signal which controls the passing of the useful signal through the low pass narrow band filter. Since the filter unit 29 only passes a signal representing a useful seismic wave when the time delay of pickup head 47 is equal to the travel time of such useful wave, the determination of the time delay of the time-delayed signal controlling filter system 29 at the given instant when a signal is passed by 29, denotes the travel time of the useful seismic wave represented by the recorded signal.

From the detailed discussion above, it it clear that one of the advantages of the basic method is that little or no signal is passed through receiver 19, FIGURE 2, unless a reflected signal 1 and its delayed counterpart 3 (FIGURE 1), are in synchronism. Although this method of continuous wave operation is a great advancement over the prior art, certain aspects of the method can be improved. For instance, it is not desirable to spend actual exploration time analyzing the records. That is, the time set forth in the basic method pertaining to variably-delaying the signal received adjacent the generator and mixing it with the signal received at the remote seismometer are steps that can well be conducted in the laboratory. If the record is analyzed in the field, it is sometimes necessary to repeat the cyclically-varying signal 1 through its period 11 on the order of several hundred times. This is necessary since the adjacent signal must be variably-delayed through a predetermined period in order that the reflected waves to the maximum depth of interest may be caused to arrive in synchronism with the delayed signal. Depending on the conditions of the terrain being explored and the maximum depth of interest, actual field recording and analysis time is roughly on the order of 5 to 15 minutes per position. This, of course, excludes the time required to set up and take down the equipment at each particular location. However, since the amount of improvement obtained by increasing the repetitions varies as the square root of the number of cycles or repetitions the total operating time always depends on the desired results as well as the operating conditions, and therefore, cannot be fixed to any certain time limit. Because the cost of a continuous wave survey, or seismic survey is primarily determined by the time spent in the field by the exploration crew, it is highly desirable to keep this time to the minimum. Laboratory analysis of records not only reduces the time spent in the field, but also provides better equipment, more satisfactory working conditions, and time to make more repetitions, and therefore produce better and more accurate results.

It is, therefore, an object of this invention to provide an improved method and apparatus for conducting continuous wave seismic exploration.

A further object of this invention is to provide a method and apparatus for reducing field exploration time.

A further object of this invention is to provide a method and apparatus for recording a short field record which may be operated on continually for analysis purposes.

A further object of this invention is to provide an improved method and apparatus for examining a record of a continuous wave exploration.

A further object of this invention is to provide a method and apparatus which improves the resolution of continuous wave field records by increasing the scanning time of same.

A further object of this invention is to provide a method and apparatus for increasing signal-to-noise ratio on a continuous wave field record.

A further object of this invention is to provide an improved method and apparatus for reducing speed variations in continuous wave magnetic records.

The general arrangements and other objects of our invention may be more readily determined by the discussion to follow:

Briefly, the improved mehod of continuous wave operation includes generating a continuous wave and cyclically-varying its frequency, receiving said wave at a point adjacent the generator, receiving the wave at a remote location, simultaneously recording both received waves as first and second electrical signal with appropriate timing indicia, continuously playing back the recorded signals, variably time-delaying the first electrical signal, and using the first and second signals in such a manner that only an indication of the second electrical signal having the same frequency variation as the time-delayed first signal and in phase therewith is rerecorded.

Figure 3:
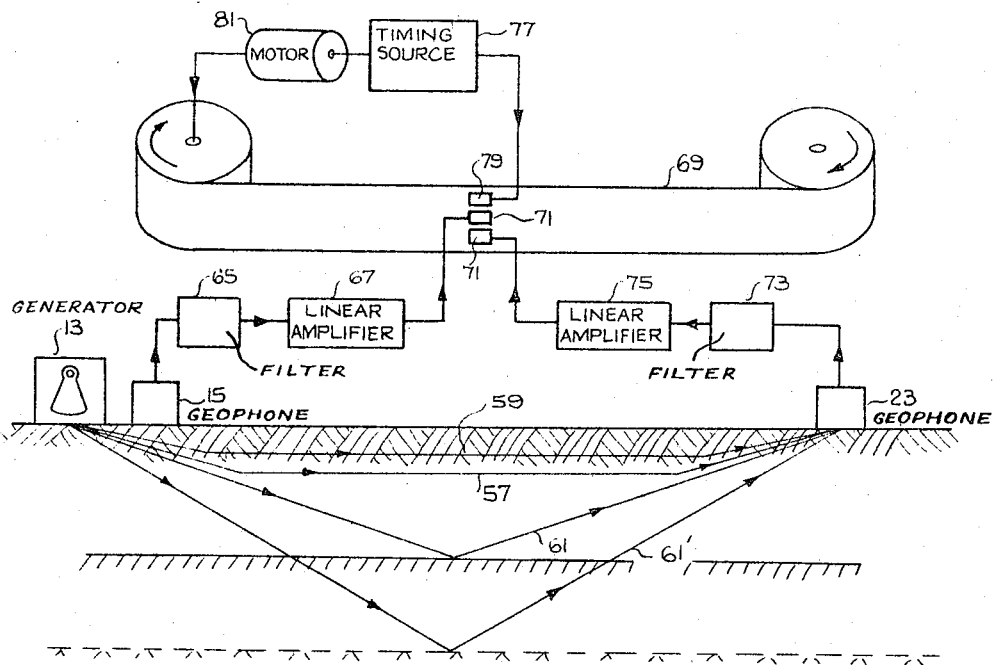
FIGURE 3 is a block diagram of a field recorder adapted to practice the improved method of operation.
Figure 4:
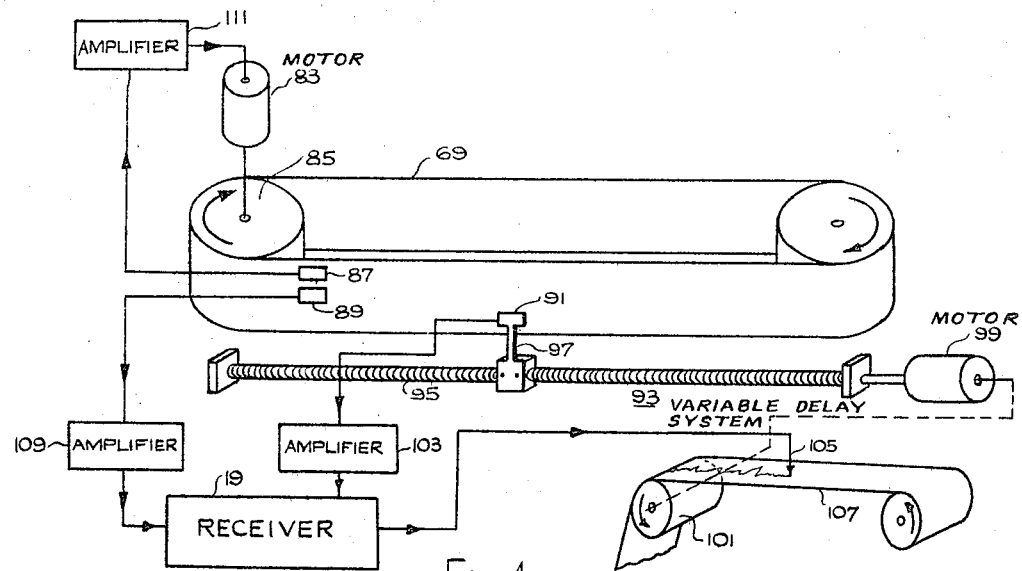
FIGURE 4 is a block diagram of one device capable of analyzing the continuous wave record according to the improved method.

Let us now consider the preferred embodiment of the invention and the device to practice it. FIGURE 3 shows a field recorder suitable for recording the continuous wave seismic method of operation. FIGURE 4 shows a playback analyzer suitable for operating on the record made by the field recorder shown in FIGURE 3. In practice, generator 13, geophone 15, and remote geophone 23 are appropriately placed in an area of interest as shown in FIGURE 3. Generator 13 is then operated to produce a cyclically-varying signal 1 as shown in FIGURE 1. The resulting refracted wave 57, horizontally-traveling wave 59, and reflected waves 61 and 61', etc., are received by remote geophone 23 at the end of their respective travel time. Signal 3, FIGURE 1, is received by adjacent geopone 15 (without passing through a variable delay as described in the basic application), filtered by 65, amplified by linear amplifier 67, and recorded on magnetic tape 69, by head 71. The later arriving signals 57, 59, 61, 61', etc., received at geophone 23, are filtered by 73, amplified by linear amplifier 75, and recorded on magnetic tape 69, by head 71. Throughout the recording operation, an accurate frequency source 77 records timing signals with head 79. In addition, the frequency source 77 drives synchronous motor 81 with the same frequency output that is recorded by head 79.

After generator 13 has produced the desired number of cyclically-varying periods 11, usually from 5 to 15, depending upon the depth of interest, type of terrain, time available, etc., the exploration crew moves the generator and geophones to the next position. After the exploration has been completed, the output signals from the adjacent geophone 15 and remote geophone 23 as recorded on magnetic tape 69 are sent to a laboratory or other facilities for further analysis. Since the exploration crew is not detained at each position while the delayed signal is played throughout its required span of operation, actual exploration time is reduced materially. Although various types of equipment may be utilized to analyze the magnetic records made in the field, the device shown in FIGURE 4 is the preferred embodiment. This device includes synchronous drive motor 83, tape drum 85, previously recorded magnetic tape 69. Timing pickup head 87, remote pickup head 89, variable delay pickup head 91, variable delay system 93, including lead screw 95, variable delay pickup head mounting 97, and constant speed drive motor 99. Motor 99 is connected to screw 95 and chart drive 101. Pickup head 91 is connected through amplifier 103 and receiver 19, to recording stylus 105 on chart 107. For a detailed diagram of receiver 19, see FIGURE 2. Pickup head 89 is connected through amplifier 109 to receiver 19. Timing signal pickup 87 is connected through amplifier 111 to synchronous drive motor 83.

In the embodiment of the device shown in FIGURE 4, magnetic tape 69 recorded in the field has now been connected to form an endless tape. As described heretofore, tape 69 is the recording of the adjacent and remote geophones at a particular position of a survey as shown in FIGURE 3. Of course, it should be understood that it is not necessary to make tape 69 into an endless belt, but this type of operation has several advantages. By making an endless belt as shown in FIGURE 4, a limited number of signal periods recorded in the field can be continually replayed and the delay 5, FIGURE 1, continually varied until all reflections 61, 61', etc., arrive in synchronism with the delayed counterpart, signal 3 (FIGURE 1) as described in the basic method of operation. As pointed out in the basic method, when the two signals arrive in synchronism, the remotely received signal is passed and recorded together with its appropriate two-way travel time.

Let use now consider the detailed operation of the playback analyzer shown in FIGURE 4. Synchronous drive motor 83 is actuated and timing signal pickup 87 reads timing signals previously recorded on tape 69. The signals are amplified by 111 and fed to synchronous motor 83. The timing signals insure that tape 69 is driven at the same speed at which it was recorded. Pickup head 89 reads the previously recorded signal from geophone 23, and variable delay pickup 91 reads previously recorded signals from geophone 15. Both signals are amplified and passed to receiver 19. The operation of receiver 19 is as described in the operation of FIGURE 2 and in the basic method application. When the signals from pickup 89 and pickup 91 are in synchronism, an indication of the signal from pickup 89 is passed through receiver 19 and recorded by 105 on chart 107. For simplicity's sake, a travel time indicator such as 55 shown in FIGURE 2 is not shown in FIGURE 4. Tape 69 is continuously rotated and delay mechanism 93 is continually varied until all of the reflections 61, 61', etc., arrive in synchronism with particular delayed signals from pickup head 91 and are rotated as described heretofore.

With the device described in the basic method, the relative rate of advance of pickup head 97 is determined by the resolution of the system, and the band width of the system is determined by low pass filter 35 in receiver 19 (see FIGURE 2). However, with the device shown in FIGURE 4, it is possible to allow the system to run much longer than it is practical to run a system such as shown in FIGURE 2. Therefore, it is obvious from the explanation above that although the field recording time is reduced to a minimum, improved resolution is obtained by increasing the scanning time in the laboratory, a better signal-to-noise ratio is obtained because the increased scanning time permits a decrease in the width of filter 35 and speed variations are reduced over the system since the two signals are recorded simultaneously on the same tape.

With the improved method and preferred embodiment of practicing same in mind, it is clear that the invention can be practiced in various other ways obvious to those skilled in the art. For instance, it is possible to utilize higher playback speeds in the laboratory. This would serve to divide the required analysis time by the factor of the increased speed.

However, it should be noted that this would also compress the time separation of pickup heads 89 and 91 in FIGURE 4.

Another variation can involve splitting tape 69 into two tapes so that the remote signal is recorded on one tape and the adjacent signal is recorded on a second tape. By varying slightly the speed of one tape in relation to the speed of the other tape, the proper varied delay could be entered on the adjacent signal.

Although the method and apparatus has been illustrated as operating on seismic data, it is obvious that it is just as appropriate for well velocity operations and other exploration operations requiring the elimination of excessive field time. Therefore, it is to be observed that although the specific embodiments of the instant invention have been illustrated and described herein, various modifications and substitutions may be made which will be obvious to those skilled in the art without departing from the scope of the present invention which is limited by the appended claims.

We claim:

1. A geophysical continuous wave analyzing system for determining the travel time of a seismic signal of cyclically varying frequency received at a point remote from the point of generation of said signal and recorded on a record medium by comparing said seismic signal with a second signal of cyclically varying frequency having the same frequency variations as said seismic signal and recorded in side-by-side relationship with said seismic signal on said record medium, comprising:
   (a) means for rotation of the record medium,
   (b) a first detector mounted adjacent said record medium and adapted to detect said seismic signal and convert it to a first electrical signal,
   (c) a second detector mounted adjacent said record medium and adapted to detect said second signal and convert said second signal to an electrical signal,
   (d) a variable delay means connected to the output of said second detector,
   (e) a filtering unit connected to the output of said first detector and the output of said delay means whereby the pass band of said filtering unit is controlled by the output from said delay means and said first signal is passed through said filtering unit when said first signal and the delayed second signal are in time phase with one another, and
   (f) recording means connected to the output of said filtering unit and adapted to record the output of said filtering unit.

2. A system as set forth in claim 1 wherein a timing signal is also recorded on the recording medium, a third detector is mounted adjacent the said recording medium and is adapted to detect said timing signal and the output of said third detector is utilized to control the speed of rotation of said record medium.

3. In a system as set forth in claim 2 wherein the delay means is connected to the second recorder means and the speed of the playback system is controlled by the output of the timing signal detector.

References Cited by the Examiner

UNITED STATES PATENTS

| | | | |
|---|---|---|---|
| 2,275,736 | 3/1942 | Cloud | 181—0.5 |
| 2,521,130 | 9/1950 | Scherbatskoy | 181—0.5 |
| 2,620,890 | 12/1952 | Lee et al. | 340—15.5 X |
| 2,857,567 | 10/1958 | Jakosky | 181—0.5 |
| 2,888,663 | 5/1959 | Blake et al. | 181—0.5 |
| 2,982,371 | 5/1961 | Woods et al. | 181—0.5 X |
| 2,989,726 | 6/1961 | Crawford et al. | 340—15.5 |

BENJAMIN A. BORCHELT, *Primary Examiner.*

CHARLES W. ROBINSON, CHESTER L. JUSTUS, SAMUEL FEINBERG, *Examiners.*

S. J. TOMSKY, V. J. DI PIETRO, J. W. MILLS, M. F. HUBLER, *Assistant Examiners.*